3,222,347
PROCESS OF PRODUCING CIS-1,4 POLYBUTADI-
ENE WITH A 3-COMPONENT CATALYST
Ralph C. Farrar and Floyd E. Naylor, Bartlesville, Okla.,
assignors to Phillips Petroleum Company, a corporation
of Delaware
No Drawing. Filed Aug. 8, 1960, Ser. No. 47,946
7 Claims. (Cl. 260—94.3)

This invention relates to a process for polymerizing 1,3-butadiene so as to obtain a rubbery polymer. In one aspect, the invention relates to a process for producing cis 1,4-polybutadiene and to a novel catalyst system therefor.

Numerous methods have been advanced for the polymerization of 1,3-butadiene, including emulsion polymerization, alkali metal-catalyzed polymerization, and alfin-catalyzed polymerization. In the emulsion polymerization of butadiene, a polymer is obtained which has from about 60 to about 80 percent trans-1,4-addition, from about 5 to about 20 percent cis-1,4-addition and from 15 to about 20 percent 1,2-addition. Sodium-catalyzed polybutadiene has been found to contain from about 60 to about 75 percent 1,2-addition, the remainder being cis and trans-1,4-addition. The utilization of potassium and other alkali metals as catalysts may cause the latter ratios to vary to some degree. A polybutadiene produced by an alfin-catalyzed polymerization has from about 65 to about 75 percent trans 1,4-addition, from about 5 to about 10 percent cis 1,4-addition, and from 20 to about 25 percent 1,2-addition. Until rather recently it appears that no polymer of butadiene had been produced which contained more than about 50 percent cis 1,4-configuration. It has recently been discovered that a polybutadiene containing a very high percentage of cis 1,4-addition can be produced by utilizing a catalyst comprising certain organometals and titanium tetraiodide. This was indeed a surprising discovery when it is considered that catalysts containing other titanium halides are ineffective in producing a polybutadiene containing a high percentage of cis-unsaturation. For example, when using a catalyst comprising a trialkylaluminum and titanium tetrachloride, the product has a cis-content which generally ranges from 60 to 70 percent and contains a substantial quantity of gel. By using a catalyst comprising a trialkylaluminum and titanium tetraiodide, it is possible to obtain a gel-free polybutadiene which contains 95 percent and higher cis 1,4-addition. Titanium tetraiodide is a solid material which is insoluble in the diluent normally employed in the polymerization. As a result of this insolubility, the titanium tetraiodide is somewhat inconvenient to charge to the polymerization reactor. Furthermore, titanium tetraiodide is a costly material as compared to other metal halides. In accordance with the present invention, a process is provided for preparing a polybutadiene of high cis 1,4-content, which is not subject to the disadvantages of the organometal-titanium tetraiodide catalyst.

It is an object of this invention to provide a novel process for producing a rubbery polymer of 1,3-butadiene.

Another object of the invention is to provide a process for polymerizing 1,3-butadiene in which the rubbery polymer product produced contains a high percentage of cis 1,4-addition.

A further object of the invention is to provide a catalyst system containing a titanium chloride which is effective in polymerizing 1,3-butadiene to a polybutadiene containing a high percentage of cis 1,4-addition.

A further object of the invention is to provide a new and improved catalyst system containing titanium tetraiodide, which is effective in polymerizing 1,3-butadiene to a polybutadiene containing a high percentage of cis 1,4-addition.

Other and further objects and advantages of the invention will become apparent to those skilled in the art upon consideration of the accompanying disclosure.

The present invention is concerned with a process for producing a polybutadiene in which a high percentage, e.g., from 85 to 95 percent and higher, of the polymer is formed by cis 1,4-addition of the butadiene. Broadly speaking, the process of this invention comprises the step of contacting 1,3-butadiene with a catalyst selected from the group consisting of (1) a catalyst which forms on mixing components comprising an organometal compound, a titanium tetrachloride or tetrabromide, and an inorganic iodide, and (2) a catalyst which forms on mixing components comprising an organometal compound, titanium tetraiodide, and an inorganic chloride or bromide. In one embodiment of the invention, the process comprises the step of contacting 1,3-butadiene with a catalyst composition selected from the group consisting of (1) a catalyst which forms on mixing components comprising (a) a compound having the formula $R_nM$, wherein R is a radical selected from the group consisting of alkyl, cycloalkyl, aryl, aralkyl and alkaryl, M is a metal selected from the group consisting of aluminum, gallium, indium and thallium and $n$ is an integer equal to the valence of the metal M, (b) a titanium halide having the formula $TiX_4$, wherein X is a halogen selected from the group consisting of chlorine and bromine, and (c) an inorganic iodide having the formula $M'I_x$, wherein M' is a member selected from the group consisting of beryllium, zinc, cadmium, aluminum, gallium, indium, thallium, silicon, germanium, tin, lead, phosphorus, antimony, arsenic and bismuth, and $x$ is an integer from 2 to 5, inclusive, and (2) a catalyst which forms on mixing components comprising (a') a compound having the formula $R_nM$, wherein R, M and $n$ are as defined hereinabove, (b') titanium tetraiodide, and (c') an inorganic halide having the formula $M''X_y$, wherein M'' is a member selected from the group consisting of aluminum, gallium, indium, thallium, germanium, tin, lead, phosphorus, antimony, arsenic and bismuth, X is as defined hereinabove, and $y$ is an integer from 2 to 5, inclusive.

As mentioned hereinbefore, it has been previously suggested that 1,3-butadiene can be polymerized with a catalyst system comprising an organometal and titanium tetrachloride. However, the product produced with this catalyst contains only about 60 to 70 percent cis 1,4-addition, and includes a substantial quantity of gel. It has now been found that if an inorganic iodide, as described hereinbefore, is included in a catalyst system containing an organometal compound and a titanium tetrachloride or tetrabromide, the polybutadiene product produced with the resulting catalyst contains a high percentage of cis 1,4-addition and is substantially gel-free. It has also been previously mentioned that while an organometal compound-titanium tetraiodide catalyst is very effective in polymerizing butadiene to a cis 1,4-polybutadiene, the use of this catalyst does entail certain disadvantages because of the relatively high cost of titanium tetraiodide and the insolubility of this material in hydrocarbon diluents. It has now been found that a substantial portion of the titanium tetraiodide in an organometal-titanium tetraiodide catalyst can be replaced with certain inorganic chlorides or bromides, as specified hereinbefore, so as to give a highly efficient catalyst for the production of gel-free butadiene polymers having an unusualy high cis-content. The particular chlorides used in the catalyst system solubilize the titanium tetraiodide, thereby facilitating the charging of this component to the reactor system. Furthermore, the cost of the chlorides is usually less than the titanium tetraiodide, so that the cost of catalyst per pound of polymer is usally less than when employing the organometal-titanium tetraiodide catalyst system. In a commercial operation, this is, of course, a very important advantage.

Examples of organometal compounds having the formula $R_nM$, which are suitable for use in the catalyst system of this invention include trimethylaluminum, triethylaluminum, triisobutylaluminum, tri-n-dodecylaluminum, tricyclopentylaluminum, triphenylaluminum, tri-p-tolylaluminum, and tribenzylaluminum. Corresponding compounds of gallium, indium and thallium, can also be employed in the catalyst system.

Regarding the titanium tetrachloride or tetrabromide component of the catalyst system, it is usually preferred to employ titanium tetrachloride. Inorganic iodides which are used in the catalyst system are iodides of certain metals of Groups II, III, IV and V of the Periodic System, such as beryllium diiodide, zinc diiodide, cadmium diiodide, aluminum triiodide, antimony triiodide, tin tetraiodide, lead tetraiodide, phosphorus triiodide, antmony pentaiodide, arsenic diiodide, arsenic triiodide, arsenic pentaiodide, silicon tetraiodide, germanium tetraiodide, bismuth triiodide, gallium triiodide, indium triiodide and thallium triiodide. It has been found that iodides of other metals, e.g., metals of Groups I, II, VI, VII and VIII, do not promote the formation of polybutadienes containing a high percentage of cis-unsaturation.

Examples of inorganic chlorides or bromides which can be used in the instant catalyst systems include aluminum trichloride, germanium tetrachloride, tin tetrachloride, phosphorus trichloride, arsenic trichloride, antimony trichloride, and the corresponding bromides. It is to be understood that mixtures of compounds within the above-described classes of compounds can be employed in the catalyst system.

Examples of specific catalyst systems which can be employed in the practice of this invention include the following: triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silcon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and phosphorus trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

When practicing the present process, an excess of the organoaluminum compound is employed, i.e., the molar quantity exceeds that of the total molar quantities of the halides. With a catalyst comprising an organometal compound, a titanium chloride or bromide, and an inorganic iodide, the mole ratio of organometal compound to total halides (titanium tetrachloride or tetrabromide plus metal iodide) is in the range of 1.25:1 to 20:1, with at least a 2:1 mole ratio of organometal compound to total halides being preferred. The mole ratio of titanium tetrachloride or tetrabromide to inorganic iodide is in the range from 0.05:1 to 5:1, with a 1:1 or greater mole ratio of titanium tetrachloride or tetrabromide to inorganic iodide being preferred. With a catalyst comprising an organometal compound, titanium tetraiodide, and an inorganic chloride or bromide, the amount of organometal compound used in excess of the total halides is determined by the particular inorganic chloride or bromide employed, and the amount is also affected by the reaction conditions. For example, when aluminum chloride is used, polymerization occurs when the mole ratio of organometal to total halides is 2:1 or less while with phosphorus trichloride, higher ratios give better results. In general, the mole ratio of organometal compounds to total halides (titanium tetraiodide plus inorganic chloride or bromide) is in the range of 1.25:1 to 20:1, with at least a 2:1 or more ratio of organometal compound to total halides being preferred. The mole ratio of the inorganic chloride or bromide to the titanium tetraiodide is in the range of 0.5:1 to 5:1, with a 1:1 or greater mole ratio of inorganic chloride or bromide to titanium tetraiodide being preferred.

The catalyst level is usually in the range of 1 to 20 gram millimoles of organometal compound per 100 grams of 1,3-butadiene to be polymerized. The particular catalyst level used is dependent upon the molecular weight of the product desired. The catalyst level can be higher than that specified if it is desired to prepare a liquid polymer.

The polymerization process of this invention is usually carried out in the presence of a diluent. Diluents suitable for use in the process include aromatics, such as benzene, toluene, xylene, ethylbenzene, and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Cycloparaffins, such as cyclohexane and methylcyclohexane, can also be used. Also, mixtures of any of the aforementioned hydrocarbons can be employed as diluents. It is also within the scope of the invention to use other types of diluents, such as olefins, e.g., styrene, 1-butene and 2-butene; vinyl halides, e.g., trichloroethylene; and aryl halides, e.g., chlorobenzene and chloronaphthalene. It is preferred to employ an aromatic hydrocarbon diluent since polymers having the highest cis-contents are obtained when the polymerization is carried out in the presence of such a material.

The polymerization process of this invention can be carried out at temperatures varying over a rather wide range, e.g., from −100° to 250° F. It is usually preferred to carry out the process at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressures can be utilized if desired, these pressures being obtained by some such suitable method as the pressurization of the reactor with a gas which is inert with respect to the polymerization reaction. It is to be understood also that it is within the scope of the invention to carry out the polymerization in the solid phase.

The process of this invention can be carried out as a batch process by charging 1,3-butadiene into a reactor containing catalyst and diluent. Although any suitable charging procedure can be used, it is usually preferred to add the 1,3-butadiene to a reactor containing diluent and thereafter introduce the catalyst components. In another charging procedure, the catalyst components are added to a reactor containing diluent after which the 1,3-butadiene is introduced. It is also within the scope of the invention to preform the catalyst by reacting the catalyst components within a separate catalyst preparation vessel. The resulting reaction product is then charged to reactor containing monomer and diluent, or these latter materials can be added after the catalyst. The process can also be carried out continuously by maintaining the above-mentioned concentrations of reactants in the reactor for suitable residence times. The residence time in the continuous process will, of course, vary within rather wide limits depending upon such variables as temperature, pressure, the ratio of catalyst components, and the catalyst concentrations. In a continuous process, the residence time will usually fall within the range of 1 second to 5 hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is highly desirable, therefore, that the 1,3-butadiene be freed of these materials as well as other materials which may tend to inactivate the catalyst. Any of the known means for removing such contaminants can be used. Furthermore, when a diluent is used in the process, it is preferred that this material be substantially freed of impurities such as water, oxygen, and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

At the completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenylbeta-naphthylamine, to the polymer solution prior to recovery of the polymer. After addition of the catalyst-inactivating agent and the antioxidant, the polymer present in the solution can then be separated by the addition of an excess of a material such as ethylalcohol or isopropyl alcohol. When the process is carried out continuously, the total effluent from the reactor can be pumped from the reactor to a catalyst-inactivating zone where the reactor effluent is contacted with a suitable catalyst-inactivating material, such as an alcohol. When an alcohol is used as catalyst-inactivating material, it also functions to precipitate polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents and fillers such as have been employed in natural rubber can likewise be used when compounding the rubbers of this invention. It is also within the scope of the invention to blend the polymers with other polymers such as natural rubber, polyethylene and the like. As mentioned hereinbefore, the polymers of this invention have a high cis 1,4-content which renders them particularly suitable for applications requiring low hysteresis, high resiliency and excellent abrasion resistance. In general, the polymers have utility in applications where natural and synthetic rubbers are used. They are especially useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analyses. This work was carried out in order to determine the percentage of the polymer formed by cis 1,4-addition, trans 1,4-addition and 1,2-addition of the butadiene. In certain of the runs, the particular determinations were made by the complete infrared method described by Silas, Yates and Thornton in "Determination of Unsaturation Distribution in Polybutadiene by Infrared Spectrometry," Analytical Chemistry 31, 529 (1959), using extinction coefficients of 133 for trans 1,4- and 184 for vinyl. In other runs, it is stated in appropriate footnotes that the values for cis 1,4-addition were obtained by difference, and the procedure described hereinafter was employed in making the determinations in these runs.

The polymer samples were dissolved in carbon disulfide to form a solution having 25 grams of polymer per liter of solution. The infrared spectrum of each of the solutions (percent transmission) was then determined in a commercial infrared spectrophotometer or an infracord.

The percent of total unsaturation present as trans 1,4- was calculated according to the following equation and consistent units:

$$\epsilon = \frac{E}{tc}$$

where $\epsilon$ equals extinction coefficient (liters-mols$^{-1}$-centimeters$^{-1}$); E equals extinction (log $I_0/I$); $t$ equals path length (centimeters); and $c$ equals concentration (moles double bond/liter). The extinction was determined at the 10.35 micron band. The extinction coefficient was 146 (liters-mols$^{-1}$-centimeters$^{-1}$) when using the infracord and 126 for the spectrophotometer.

The percent of the total unsaturation as 1,2-(vinyl) was calculated according to the above equation, using the 11.0 micron band. The extinction coefficient was 184 (liters-moles$^{-1}$-centimeters$^{-1}$) when using the infracord and 173 for the spectrophotometer.

The percent of the total unsaturation present as cis 1,4- was obtained by subtracting the trans 1,4- and 1,2-(vinyl) determined according to the above procedures, from the theoretical unsaturation, assuming one double bond per each $C_4$ unit in the polymer.

*Example I*

A series of polymerization runs was conducted in which 1,3-butadiene was polymerized by means of a catalyst system formed by mixing triisobutylaluminum, titanium tetrachloride, and antimony triiodide. The polymerization recipe was as follows:

| | |
|---|---|
| 1,3-butadiene, grams | 100 |
| Toluene, grams | 1200 |
| Triisobutylaluminum (TBA), millimoles | 3.5 |
| Titanium tetrachloride (TTC) | Variable |
| Antimony triiodide (SbI$_3$) | Variable |
| Temperature, ° C. | 5 |
| Time, hours | 1 |

Polymerization was effected in 7-ounce bottles. Toluene was charged first to the bottles, followed by a nitrogen purge. The bottles were capped, pressured to 20 p.s.i. with nitrogen, and the triisobutylaluminum was added as a 0.43 molar solution in toluene. A solution of titanium tetrachloride and antimony triiodide was prepared in toluene, 0.01 molar in each halide, and charged next. The temperature was adjusted by placing the bottles in a 5° C. bath after which the butadiene was introduced. The bottles were again placed in the 5° C. bath and tumbled throughout the polymerization period. Thereafter, the bottles were removed from the bath, a small amount of isopropanol was added as a shortstop, and each reaction mixture was poured into approximately one liter of isopropanol and stirred vigorously. Approximately 2 weight percent (based on the weight of the polymer) of an antioxidant [2,2'-methylene-bis(4-methyl-6-tert.-butyl-phenol)] was added to the isopropanol prior to its use as a coagulant. The polymer which precipitated was separated and dried overnight in a vacuum oven. Results of the several runs are shown in the following table:

| Run No. | TBA:TTC:SbI$_3$, Millimoles Charged | TBA:Total Halide, Mole Ratio | Conversion, Percent |
|---|---|---|---|
| 1 | 3.5:0.84:0.84 | 2.08:1 | 72 |
| 2 | 3.5:0.7:0.7 | 2.5:1 | 89 |
| 3 | 3.5:0.5:0.5 | 3.5:1 | 66 |

The structure of the polymer from run 2 was determined by infrared analysis method of Silas, Yates and Thornton, and the results were as follows:

| | Percent |
|---|---|
| Cis | 95.3 |
| Trans | 1.8 |
| Vinyl | 2.9 |

*Example II*

1,3-butadiene was polymerized in the presence of a catalyst system prepared from triisobutylaluminum, titanium tetrachloride, and aluminum triiodide. The recipe was as follows:

| | |
|---|---|
| 1,3-butadiene, grams | 100 |
| Toluene, grams | 866 |
| Triisobutylaluminum (TBA), millimoles | 2.07 |
| Titanium tetrachloride (TTC), millimoles | 0.4 |
| Aluminum triiodide, millimoles (AlI$_3$)[1] | 0.16 |
| Catalyst age at 30° C., minutes | 3 |

[1] Charged as the reaction product of AlI$_3$ with TBA, in a 1:2 mole ratio.

Aluminum triiodide was prepared by adding 1.1394 grams (4.48 millimoles) of iodine to 60.5 grams (69.9 cc.) of toluene which had previously been charged to a dry bottle. An excess of aluminum was introduced (0.232 gram or 8.60 millimoles) and complete reaction occurred within one hour. The excess of aluminum was removed by filtration. Concentration of the solution, calculated on the basis of iodine added, was 0.0427 molar in aluminum triiodide.

Twenty milliliters of the 0.0427 molar aluminum triiodide solution (0.8540 millimoles AlI$_3$) was added to 3.36 ml. of a 0.760 molar solution of triisobutylaluminum in toluene (2.554 millimoles of triisobutylaluminum) to make a solution which was 0.0365 molar in aluminum triiodide and 0.1093 molar in triisobutylaluminum. Aluminum triiodide was charged in this form to the polymerization system.

Polymerization was effected in a 7-ounce bottle. The toluene was charged first, followed by a nitrogen purge. Triisobutylaluminum (0.8 millimole) and 0.4 millimole titanium tetrachloride were then added. No reaction occurred and 0.8 millimole more of the triisobutylaluminum was introduced which resulted in the formation of a black precipitate. The aluminum triiodide-triisobutylaluminum mixture, previously prepared, was then added (4.27 cc. containing 0.16 millimole of AlI$_3$ and 0.47 millimole of triisobutylaluminum) followed by butadiene. The bottle was placed in a 30° C. both for one hour. Conversion was quantitative. An antioxidant solution of phenyl-beta-naphthylamine in toluene was added to the reaction mixture. The polymer was recovered by coagulation in isopropanol and drying in a vacuum oven. A high cis polymer was obtained which had an inherent viscosity of 3.61 and was gel free. The microstructure of the polymer as determined on the infracord was as follows:

| | Percent |
|---|---|
| Cis | [1] 92.3 |
| Trans | 4.0 |
| Vinyl | 3.7 |

[1] Value obtained by difference.

*Example III*

Two runs were carried out in which 1,3-butadiene was polymerized with a catalyst formed rom triisobutylaluminum, titanium tetrachloride and aluminum triiodide. The following recipes were employed for these runs:

| | I | II |
|---|---|---|
| 1,3-butadiene, grams | 100 | 100 |
| Toluene, grams | 866 | 866 |
| Triisobutylaluminum (TBA), millimoles | 2.3 | 2.7 |
| Titanium tetrachloride (TTC), millimole | 0.4 | 0.4 |
| Aluminum triiodide (AlI$_3$), millimole | 0.13 | 0.13 |
| Catalyst age at 30° C., minutes | 2 | 2 |
| Temperature, °C. | 30 | 30 |
| Time, hours | ([1]) | ([1]) |

[1] Approximately 75 in each run.

In each of the polymerization runs, toluene was charged first, followed by a nitrogen purge. Triisobutylaluminum was then added (1.9 millimoles in the first run and 2.3 millimoles in the second) followed by a dispersion prepared from aluminum triiodide, triisobutylaluminum and titanium tetrachloride. The butadiene was charged last. The aforementioned dispersion was prepared by mixing 0.13 millimole of aluminum triiodide (0.0427 molar solution described in Example II), 0.4 millimole of triisobutylaluminum (0.760 molar solution in toluene), and 0.4 millimole of titanium tetrachloride and heating at 80° C. for 5 to 10 minutes. The conversion in each run and the inherent viscosity and gel-content of the products are set forth below in the table. The microstructure of each polymer as determined on the infracord is also shown in the table.

| | I | II |
|---|---|---|
| Conversion, Percent | 95 | 95 |
| Inherent Viscosity | 3.21 | 1.55 |
| Gel, Percent | 9 | Trace |
| Cis, Percent | [1] 92.0 | [1] 89.5 |
| Trans, Percent | 4.0 | 6.4 |
| Vinyl, Percent | 4.0 | 4.1 |

[1] Value obtained by difference.

*Example IV*

A series of polymerization runs was carried out in which 1,3-butadiene was polymerized by means of a catalyst system formed from triisobutylaluminum, titanium tetraiodide, and antimony trichloride. The polymerization recipe was as follows:

| | Parts by weight |
|---|---|
| 1,3-butadiene | 100. |
| Toluene | 1200. |
| Triisobutylaluminum (TBA) | 0.79 (4.0 mmoles). |
| Antimony trichloride ($SbCl_3$) | Variable. |
| Titanium tetraiodide (TTI) | Variable. |
| $SbCl_3$:TTI mole ratio | 1:1.1 |
| Temperature, °F. | 41 (5° C.). |
| Time, hours | 2. |

One hundred milliliters of toluene was placed in a 7-ounce bottle and purged with prepurified nitrogen for 3 minutes at the rate of 3 liters per minute. White crystals of antimony trichloride (0.234 gram, 1.03 millimoles) were dissolved in the toluene, and titanium tetraiodide (0.630 gram, 1.13 millimoles) was added as a dry powder. The bottle was capped, pressure to 25 p.s.i. with prepurified nitrogen, and tumbled at 122° F. for approximately 30 minutes. A red solution was formed.

Toluene was placed in 7-ounce beverage bottles and purged as before. The bottles were capped, pressured to 25 p.s.i. with prepurified nitrogen, charged with triisobutylaluminum, and tumbled for 30 minutes at 41° F. The solution of titanium and antimony halides was added. Butadiene was introduced and the bottles were returned to the 41° F. bath. Results after a two-hour polymerization period are shown below:

tadiene was polymerized in the presence of a triisobutylaluminum-titanium tetraiodide catalyst system. The polymerized recipe was as follows:

| | Parts by weight |
|---|---|
| Butadiene | 100. |
| Toluene | 1200. |
| Triisobutylaluminum (TBA) | 0.59 (3 mmoles). |
| Titanium tetraiodide (TTI) | Variable. |
| Temperature, °F. | 41 (5° C.). |
| Time, hours | 2. |

The results obtained are shown in the following table, which includes the microstructures of the products as determined by the infrared analysis method of Silas, Yates and Thornton.

| Run No. | TTI | | TBA:TTI, Mole Ratio | Conv., percent | Inherent Viscosity | Gel, percent | Microstructure, percent | | |
|---|---|---|---|---|---|---|---|---|---|
| | PHM | MHM | | | | | Cis | Trans | Vinyl |
| 7 | 0.56 | 1.0 | 3:1 | 90 | 2.87 | 0 | 94.3 | 2.6 | 3.1 |
| 8 | 0.42 | 0.75 | 4:1 | 81 | 2.20 | 0 | 94.9 | 2.0 | 3.1 |
| 9 | 0.33 | 0.60 | 5:1 | 65 | 2.35 | 0 | 95.7 | 1.2 | 3.1 |
| 10 | 0.28 | 0.50 | 6:1 | 53 | 2.32 | 0 | 95.9 | 1.0 | 3.1 |
| 11 | 0.18 | 0.33 | 9:1 | 28 | 2.46 | 0 | 96.4 | 0.5 | 3.1 |
| 12 | 0.15 | 0.27 | 11:1 | 15 | 2.45 | 0 | 96.4 | 0.4 | 3.2 |

A comparision of results of control runs with those in which the 3-component catalyst was used shows that much less titanium tetraiodide is required to give high conversions than when a metal chloride is present. Control run 10 with 0.28 p.h.m. titanium tetraiodide gave a 53 percent conversion whereas run 4 in which the 3-component catalyst was employed gave a 73 percent conversion in the same polymerization period when 0.245 p.h.m. titanium tetraiodide was present in the catalyst system.

*Example V*

A series of runs was carried out in which 1,3-butadiene was polymerized with a triisobutylaluminum-titanium tetraiodide-phosphorus trichloride catalyst system. The following recipe was used in these runs.

| Run No. | TTI | | $SbCl_3$ | | TBA:TTI, Mole Ratio | TBA:Total Halide, Mole Ratio | Conv., Percent | Inherent Viscosity | Gel, Percent |
|---|---|---|---|---|---|---|---|---|---|
| | PHM[1] | MHM[2] | PHM[1] | MHM[2] | | | | | |
| 1 | 0.444 | 0.8 | 0.166 | 0.73 | 5:1 | 2.6:1 | 94 | 4.33 | 0 |
| 2 | 0.372 | 0.67 | 0.139 | 0.61 | 6:1 | 3.1:1 | 100 | 3.21 | 0 |
| 3 | 0.317 | 0.57 | 0.119 | 0.52 | 7:1 | 3.7:1 | 100 | 2.58 | 0 |
| 4 | 0.245 | 0.44 | 0.091 | 0.40 | 9:1 | 4.8:1 | 73 | 2.76 | 0 |
| 5 | 0.20 | 0.36 | 0.075 | 0.33 | 11:1 | 5.8:1 | 53 | 3.06 | 0 |
| 6 | 0.148 | 0.267 | 0.054 | 0.24 | 15:1 | 7.9:1 | 22 | 3.12 | 0 |

[1] Parts by weight per 100 parts monomer.
[2] Gram millimoles per 100 grams monomer.

Microstructures were obtained on products from four of the foregoing runs by infrared analysis, and the results are shown in the following table:

| Run No. | Microstructure, percent | | |
|---|---|---|---|
| | Cis | Trans | Vinyl |
| 1 | [1]94 | 2.6 | 3.4 |
| 2 | [1]93.3 | 3.1 | 3.3 |
| 4 | [1]95 | 1.6 | 3.4 |
| 6 | [2]96.0 | 0.7 | 3.3 |

[1] Value obtained by difference (Spectrophotometer used).
[2] Values determined by infrared analysis method of Silas, Yates and Thornton.

A series of control runs was made in which 1,3-bu-

| | Parts by weight |
|---|---|
| Butadiene | 100. |
| Toluene | 1200. |
| Triisobutylaluminum (TBA) | 0.79 (4 mmoles). |
| Titanium tetraiodide (TTI) | Variable. |
| Phosphorus trichloride ($PCl_3$) | Variable. |
| Temperature, °F. | 41 (5° C.). |
| Time, hours | 4. |

The procedure of Example IV was followed for preparation of the solution of titanium tetraiodide and phosphorus trichloride in toluene as well as for the polymerization. Results of the runs are shown in the following table.

| Run No. | TTI | | PCl₃ | | TBA:TTI, Mole Ratio | TBA:Total Halide, Mole Ratio | Conv., Percent | Inherent Viscosity | Gel, Percent |
|---|---|---|---|---|---|---|---|---|---|
| | PHM | MHM | PHM | MHM | | | | | |
| 1 | 0.24 | 0.43 | 0.06 | 0.44 | 9:1 | 4.6:1 | 85 | 2.70 | 0 |
| 2 | 0.20 | 0.36 | 0.05 | 0.36 | 11:1 | 5.6:1 | 70 | 2.51 | 0 |
| 3 | 0.15 | 0.27 | 0.04 | 0.29 | 15:1 | 7.1:1 | 35 | 2.22 | 0 |

Microstructures were obtained on products from runs 2 and 3 by infrared analysis, and the results were as follows:

| Run No. | Microstructure, percent | | |
|---|---|---|---|
| | Cis | Trans | Vinyl |
| 2 | ¹94.6 | 1.9 | 3.5 |
| 3 | ²95.9 | 0.9 | 3.2 |

¹ Value obtained by difference (Spectrophotometer used).
² Values determined by infrared analysis method of Silas, Yates and Thornton.

for the polymerization of 1,3-butadiene. The recipe was as follows:

```
                                          Parts by weight
Butadiene _____ 100.
Toluene _____ 1200.
Triisobutylaluminum (TBA) _____ 0.59 (3 mmoles).
Titanium tetraiodide (TTI) _____ Variable.
Aluminum chloride (AlCl₃) _____ Variable.
Temperature, °F. _____ 41.
Time, hours _____ 2.25.
```

Results of the several runs are shown below:

| Run No. | TTI | | AlCl₃ | | TBA:TTI, Mole Ratio | TBA:Total Halide, Mole Ratio | Conv., Percent | Inherent Viscosity | Gel, Percent |
|---|---|---|---|---|---|---|---|---|---|
| | PHM | MHM | PHM | MHM | | | | | |
| 1 | 0.42 | 0.75 | 0.10 | 0.75 | 4:1 | 2:1 | 48 | | |
| 2 | 0.33 | 0.60 | 0.08 | 0.60 | 5:1 | 2.5:1 | 97 | 3.67 | 0 |
| 3 | 0.28 | 0.50 | 0.07 | 0.53 | 6:1 | 2.9:1 | 97 | 2.49 | 0 |
| 4 | 0.18 | 0.33 | 0.04 | 0.30 | 9:1 | 4.8:1 | 97 | 2.65 | 0 |
| 5 | 0.15 | 0.27 | 0.03 | 0.27 | 11:1 | 5.6:1 | 46 | 2.26 | 0 |

*Example VI*

1,3-butadiene was polymerized in a series of runs using the recipe and procedure employed in the preceding examples except that stannic chloride (SnCl₄) was used instead of SbCl₃ or PCl₃ and the polymerization time was 2.3 hours. Results are shown in the following table.

Microstructure was determined by the infrared analysis method of Silas, Yates and Thornton on the product from run 3. Results were as follows:

```
                                                  Percent
Cis _____ 94.9
Trans _____ 2.1
Vinyl _____ 3.0
```

| Run No. | TTI | | SnCl₄ | | TBA:TTI, Mole Ratio | TBA:Total Halide, Mole Ratio | Conv., Percent | Inherent Viscosity | Gel, Percent |
|---|---|---|---|---|---|---|---|---|---|
| | PHM | MHM | PHM | MHM | | | | | |
| 1 | 0.37 | 0.67 | 0.17 | 0.65 | 6:1 | 3:1 | 22 | | |
| 2 | 0.32 | 0.58 | 0.15 | 0.57 | 7:1 | 3.5:1 | 89 | 4.12 | 0 |
| 3 | 0.24 | 0.43 | 0.11 | 0.42 | 9:1 | 4.7:1 | 91 | 2.71 | 0 |
| 4 | 0.20 | 0.36 | 0.09 | 0.34 | 11:1 | 5.7:1 | 50 | 2.37 | 0 |
| 5 | 0.15 | 0.27 | 0.07 | 0.27 | 15:1 | 7.4:1 | 25 | 2.37 | 0 |

Microstructures were obtained on products from runs 2, 3 and 5 by infrared analysis, and the following results were obtained:

| Run No. | Microstructure, percent | | |
|---|---|---|---|
| | Cis | Trans | Vinyl |
| 2 | ¹94.4 | 2.3 | 3.3 |
| 3 | ¹94.4 | 2.2 | 3.4 |
| 5 | ²96.2 | 0.7 | 3.1 |

¹ Value obtained by difference (Spectrophotometer used).
² Values determined by infrared analysis method of Silas, Yates and Thornton.

*Example VII*

A triisobutylaluminum-titanium tetraiodide-aluminum chloride catalyst system was employed in a series of runs As will be evident to those skilled in the art, many variations and modifications of this invention can be practiced in view of the foregoing disclosure. Such variations and modifications are clearly believed to come within the sphere and scope of the invention.

We claim:
1. A process for polymerizing 1,3-butadiene to form a polybutadiene containing at least 85 percent cis 1,4-addition which comprises contacting 1,3-butadiene under polymerization conditions with a catalyst selected from the group consisting of (1) a catalyst which forms on mixing (a) a compound having the formula $R_nM$, wherein R is a radical selected from the group consisting of alkyl, cycloalkyl, aryl, aralkyl and alkaryl, M is a metal selected from the group consisting of aluminum, gallium, indium and thallium, and $n$ is an integer equal to the valence of the metal M, (b) a titanium halide having the formula $TiX_4$, wherein X is a halogen selected from the group con- sisting of chlorine and bromine, and (c) an inorganic iodide having the formula $M'I_x$, wherein $M'$ is a member selected from the group consisting of aluminum, and antimony, and $x$ is an integer equal to the valence of $M'$ and (2) a catalyst which forms on mixing (a') a compound having the formula $R_nM$, wherein R, M and $n$ are as defined above, (b') titanium tetraiodide, and (c') an inorganic halide having the formula $M''X_y$, wherein $M''$ is a member selected from the group consisting of phosphorus, antimony, arsenic and bismuth, X is as defined above, and $y$ is an integer equal to the valence of $M''$, the mol ratio of said $R_nM$ compound to said titanium halide and said inorganic iodide being in the range of 1.25:1 to 20:1, the mol ratio of said titanium halide to said inorganic iodide being in the range of 0.05:1 to 5:1, the mol ratio of said $R_nM$ compound to said titanium tetraiodide and said inorganic halide being in the range of 1.25:1 to 20:1 and the mol ratio of said inorganic halide to said titanium tetraiodide being in the range of 0.5:1 to 5:1.

2. A process according to claim 1 in which said catalyst is that which forms on mixing triisobutylaluminum, titanium tetrachloride and antimony triiodide.

3. A process according to claim 1 in which said catalyst is that which forms on mixing triisobutylaluminum, titanium tetrachloride and aluminum triiodide.

4. A process according to claim 1 in which said catalyst is that which forms on mixing triisobutylaluminum, titanium tetraiodide and antimony trichloride.

5. A process according to claim 1 in which said catalyst is that which forms on mixing triisobutylaluminum, titanium tetraiodide and phosphorus trichloride.

6. A process for polymerizing 1,3-butadiene, to form a polybutadiene containing at least 85 percent cis 1,4-addition which comprises contacting 1,3-butadiene with a catalyst selected from the group consisting of (1) a catalyst which forms on mixing (a) a compound having the formula $R_nM$, wherein R is a radical selected from the group consisting of alkyl, cycloalkyl, aryl, aralkyl and alkaryl, M is a metal selected from the group consisting of aluminum, gallium, indium and thallium, and $n$ is an integer equal to the valence of the metal M, (b) a titanium halide having the formula $TiX_4$, wherein X is a halogen selected from the group consisting of chlorine and bromine, and (c) an inorganic iodide having the formula $M'I_x$, wherein $M'$ is a member selected from the group consisting of aluminum and antimony, and $x$ is an integer equal to the valence of $M'$ and (2) a catalyst which forms on mixing (a') a compound having the formula $R_nM$, wherein R, M and $n$ are as defined above (b') titanium tetraiodide, and (c') an inorganic halide having the formula $M''X_y$, wherein $M''$ is a member selected from the group consisting of phosphorus, antimony arsenic and bismuth, X is as defined above, and $y$ is an integer equal to the valence of $M''$ the mol ratio of said $R_nM$ compound to said titanium halide and said inorganic iodide being in the range of 1.25:1 to 20:1, the mol ratio of said titanium halide to said inorganic iodide being in the range of 0.05:1 to 5:1, the mol ratio of said $R_nM$ compound to said titanium tetraiodide and said inorganic halide being in the range of 1.25:1 to 20:1 and the mol ratio of said inorganic halide to said titanium tetraiodide being in the range of 0.5:1 to 5:1, said contacting occurring in the presence of a hydrocarbon diluent at a pressure sufficient to maintain said 1,3-butadiene in the liquid phase and at a temperature in the range of —100 to 250° F.; and recovering the rubber polymer so produced.

7. A process for making cis-polybutadiene having at least 85% cis 1,4 addition which comprises contacting 1,3-butadiene under polymerization conditions with a catalyst which forms on mixing (a) a compound having the formula $R_nM$, wherein R is a radical selected from the group consisting of alkyl, cycloalkyl, aryl, aralkyl and alkaryl, M is a metal selected from the group consisting of aluminum, gallium, indium and thallium, and $n$ is an integer equal to the valence of the metal M, (b) a titanium halide having the formula $TiX_4$, wherein X is a halogen selected from the group consisting of chlorine and bromine, and (c) an inorganic iodide having the formula $M'I_x$, wherein $M'$ is a member selected from the group consisting of aluminum and antimony, and $x$ is an integer equal to the valence of $M'$, the mol ratio of said $R_nM$ compound to said titanium halide and said inorganic iodide being in the range of 1.25:1 to 20:1, and the mol ratio of said titanium halide to said inorganic iodide being in the range of 0.05:1 to 5:1.

References Cited by the Examiner
UNITED STATES PATENTS

| | | | |
|---|---|---|---|
| 2,938,019 | 5/1960 | Stuart | 260—94.3 |
| 2,953,554 | 9/1960 | Miller | 260—94.3 |
| 3,036,056 | 5/1962 | Rion | 260—94.3 |
| 3,042,262 | 7/1962 | Bruce et al. | 260—93.7 |
| 3,116,272 | 12/1963 | Stewart et al. | 260—94.3 |

FOREIGN PATENTS

| | | |
|---|---|---|
| 543,292 | 6/1956 | Belgium. |
| 543,856 | 6/1956 | Belgium. |
| 551,851 | 4/1957 | Belgium. |
| 581,294 | 2/1960 | Belgium. |
| 824,418 | 12/1959 | Great Britain. |

JOSEPH L. SCHOFER, *Primary Examiner.*

M. LIEBERMAN, *Examinner.*